(12) United States Patent  (10) Patent No.: US 9,116,313 B2
Traverso et al.  (45) Date of Patent: Aug. 25, 2015

(54) SILICON PHOTONICS STRUCTURES WITH PLUGGABLE LIGHT SOURCES

(75) Inventors: Matt Traverso, Santa Clara, CA (US); Adam Carter, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 618 days.

(21) Appl. No.: 13/444,055

(22) Filed: Apr. 11, 2012

(65) Prior Publication Data
US 2013/0272643 A1  Oct. 17, 2013

(51) Int. Cl.
*G02B 6/42* (2006.01)
*G02B 6/12* (2006.01)
*H04J 14/02* (2006.01)

(52) U.S. Cl.
CPC ............ *G02B 6/4206* (2013.01); *G02B 6/4261* (2013.01); *G02B 6/4284* (2013.01); *G02B 6/12004* (2013.01); *H04J 14/02* (2013.01)

(58) Field of Classification Search
None
See application file for complete search history.

(56) References Cited

U.S. PATENT DOCUMENTS

| | | | |
|---|---|---|---|
| 4,718,055 A | 1/1988 | Winzer | |
| 6,843,606 B2 | 1/2005 | Deane et al. | |
| 7,729,581 B2 | 6/2010 | Rolston et al. | |
| 7,875,522 B2 | 1/2011 | Kapur et al. | |
| 7,928,442 B2 | 4/2011 | Mheen et al. | |
| 2008/0013896 A1 | 1/2008 | Salzberg et al. | |
| 2009/0297159 A1 | 12/2009 | Margolin et al. | |
| 2010/0111473 A1 | 5/2010 | Pinguet et al. | |
| 2010/0215317 A1 | 8/2010 | Rolston et al. | |
| 2010/0316337 A1 | 12/2010 | Zhovnirovsky et al. | |
| 2011/0043897 A1 | 2/2011 | Akasaka et al. | |
| 2011/0135252 A1 | 6/2011 | Kim et al. | |
| 2011/0142396 A1 | 6/2011 | Okamoto | |
| 2011/0267676 A1 | 11/2011 | Dallesasse | |

FOREIGN PATENT DOCUMENTS

WO        0033116 A     6/2000

OTHER PUBLICATIONS

International Search Report and Written Opinion in counterpart International Application No. PCT/US2013/022840, mailed Mar. 28, 2013.

*Primary Examiner* — Jerry Rahll
(74) *Attorney, Agent, or Firm* — Edell, Shapiro & Finnan, LLC

(57) ABSTRACT

A pluggable light source device connects in a plug-in engaging manner with an optical modulating device that includes an optical modulator component. The pluggable light source includes a light generator to generate an optical signal to be output from the light source device, and a connection member disposed at a connecting end of the light source device. The connection member includes an optical connector, where the optical connector of the light source device is configured to engage with a corresponding optical connector of the optical modulating device when the connecting end of the light source device is connected via a plug-in engagement with a connection member of the optical modulating device so as to facilitate input of optical signals from the light generator to the optical modulator component.

19 Claims, 3 Drawing Sheets

US 9,116,313 B2

SILICON PHOTONICS STRUCTURES WITH PLUGGABLE LIGHT SOURCES

TECHNICAL FIELD

The present disclosure relates to silicon photonics structures and light sources associated with such structures.

BACKGROUND

Optical communication interfaces have been implemented with optics (e.g., lasers, photodiodes, etc) soldered or affixed in some manner onto the main printed circuit board (PCB). Over recent years, pluggable optical transceivers have become popular, in which small form pluggable (SFP) optical modules have been integrated with the PCB. The SFP optical modules convert electrical signals transmitted by the physical layer (PHY) of the chip, or application specific integrated circuits (ASICs) with embedded PHY technology, to the SFP module into optical signals that are modulated by the SFP module (based upon the electrical signals provided by the chip) and transported over fiber optic cables. However, SFP optical modules must be highly specialized to be capable of modulating optical signals based upon the data rates required for a particular ASIC architecture.

New silicon based modulators in emerging technologies enable the modulation and detection of light in silicon integrated circuits (ICs) which are compatible with traditional complementary metal oxide semiconductor (CMOS) processing. These silicon based modulators provide an opportunity to desist using highly specialized SFP optical modules which must be optimized to modulate for a particular data rate by pursuing a new architecture which uses the CMOS IC on-board as an optical modulator and detector. In such systems, the laser or light source can be co-packaged or integrated with the PHY chip in the PCB. However, given the reliability and failure rate of lasers and optics systems, the integration of the light source into the PHY chip can lead to costly replacements within the silicon photonics based system if the light source fails. In addition, the packaging of the light source within the PHY chip can also be expensive.

DESCRIPTION OF EXAMPLE EMBODIMENTS

Overview

A pluggable light source device connects in a plug-in engaging manner with an optical modulating device that comprises an optical modulator component. The pluggable light source comprises a light generator to generate an optical signal to be output from the light source device, and a connection member disposed at a connecting end of the light source device. The connection member comprises an optical connector, where the optical connector of the light source device is configured to engage with a corresponding optical connector of the optical modulating device when the connecting end of the light source device is connected via a plug-in engagement with a connection member of the optical modulating device so as to facilitate input of optical signals from the light generator to the optical modulator component.

Example Embodiments

Figure 1:
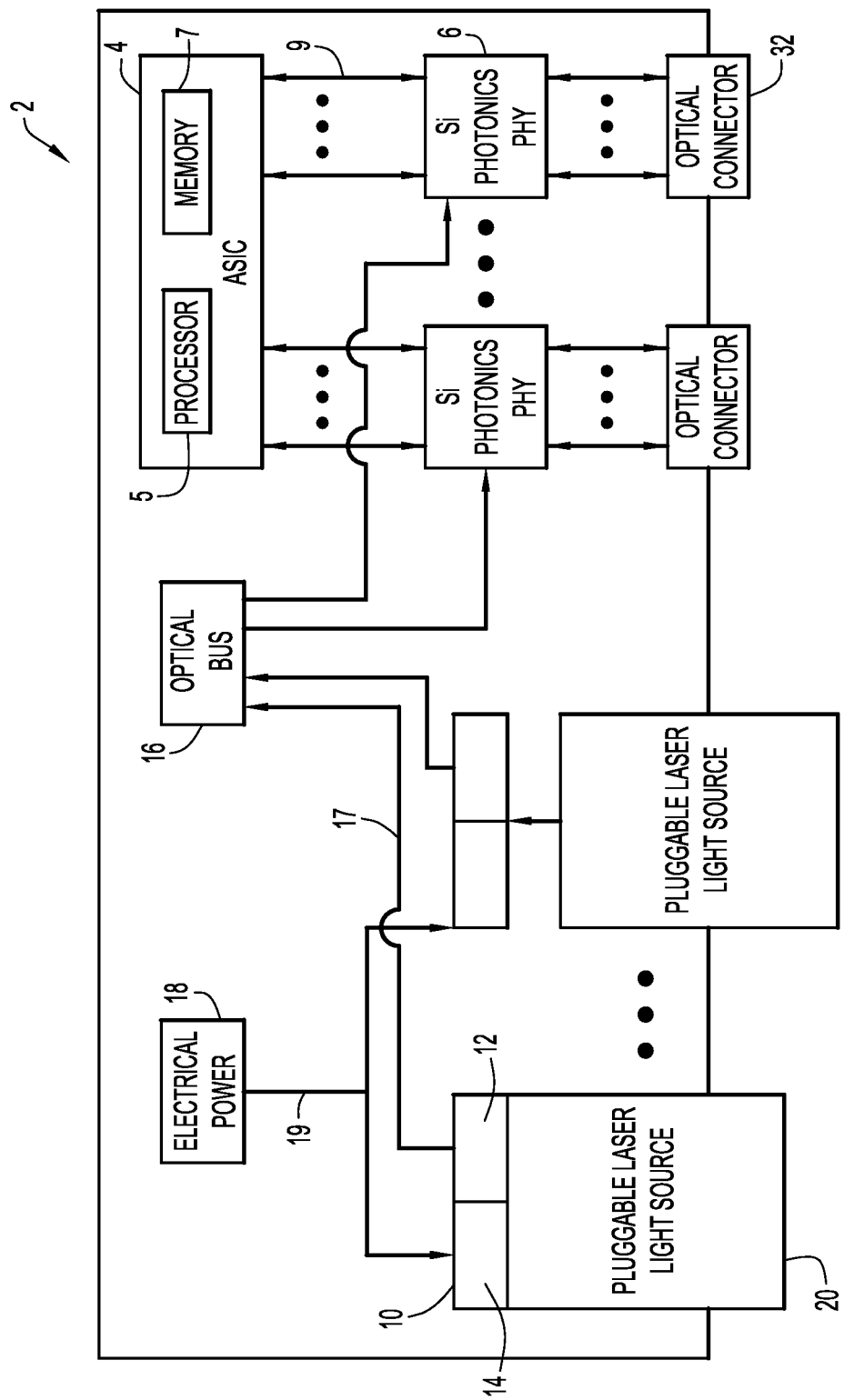
FIG. 1 is a schematic block diagram depicting details of an example embodiment of a printed circuit board that is integrated within a device and includes a silicon photonics PHY chip structure that processes and modulates optical signals that are input by one or more pluggable light sourced that connect with the printed circuit board during system operation.

Referring to FIG. 1, a schematic block diagram is depicted of an example embodiment of an architecture for a printed circuit board (PCB) 2 utilized in an optical modulating device for a silicon photonics system that facilitates a connection with a pluggable light source. It is noted that a single PCB 2 is shown for example purposes only, and the device can optionally include any selected number (e.g., two or more) of PCBs with which components of the device are connected or integrated. The device is configured such that both an optical and electrical connection are made between the pluggable light source and a photonics PHY chip of the PCB via a plug-in interface, where the pluggable light source includes a connecting end that engages in a plugging connection with a connecting member of the PCB and can also be easily removed from the PCB (e.g., to replace the light source with another pluggable light source). The connection between the pluggable light source and the PCB provides an easy plug-in connection and removal of the light source that is similar or analogous to how a pluggable data storage device such as a USB flash drive connects with a computer system. In particular, the plug-in connection includes a single connecting end (e.g., a connecting end may include a single defining plug-in side or surface) of the pluggable light source that provides an electrical coupling between the pluggable light source and the device to which it connects as well as an optical coupling that facilitates transmittance of optical signals from the pluggable light source to the device. As described herein, the electrical and optical coupling can be implemented via a frictional or sliding mechanical connection between connecting elements of the pluggable light source and corresponding connecting elements of the PCB of the device. This frictional/sliding mechanical connection can be configured so as to mechanically hold the pluggable light source in connection with a connection member of the PCB while maintaining the electrical and optical coupling between the pluggable light source and components of the PCB without the requirement of any further securing connection between the pluggable light source and PCB.

The PCB 2 can be configured to provide modulated optical signals as output from the device in a line card configuration (e.g., for use in a telecommunication network environment). Alternatively, the silicon photonics device can be configured for use with any other systems or devices in which modulated optical signals are piped via optical waveguides between two or more devices. Optionally, the silicon photonics device can also include a photodiode integrated within a component of the device to convert the modulated optical signals into electrical signals.

The PCB 2 of the device includes an integrated circuit 4, such as an application specific integrated circuit (ASIC), that includes a suitable processor 5, memory 7 as well as any other components specific to the integrated circuit to facilitate operations of the device within which the PCB 2 is integrated. The processor 5 can comprise a microprocessor that executes control process logic instructions stored within memory 7, where the control process logic instructions include operational instructions and software applications stored within memory 7 that control operations of other components integrated with the PCB 2 (including instructions for modulating optical signals that are input by one or more pluggable light sources as described further herein). The memory can comprise read only memory (ROM), random access memory (RAM), magnetic disk storage media devices, optical storage media devices, flash memory devices, electrical, optical, or other physical/tangible memory storage devices, and any combinations thereof.

The integrated circuit 4 is connected, via suitable electrical wiring connections 9, to one or more silicon photonics PHY chips 6. Each chip 6 is connected to an optical connector 32 to facilitate connection with an optical waveguide for transmission of modulated light out from the chip 6 to another portion of the PCB 2 or to another device (e.g., to another device that is separate from the device incorporating PCB 2). As described herein, the integrated circuit 4 provides electrical control signals to each silicon photonics chip 6 to control how the chips modulate optical signals that are input to the chips.

One or more connectors 10 are provided on the PCB 2 to define a mechanical connection structure that facilitates connection of one or more pluggable light sources 20 to the PCB 2 so as to input a light source from each light source 20 to the device. The connection between the connector 10 and each light source 20 includes an optical interface 12 and an electrical interface 14. Each connector 10 is connected, via electrical signal lines 19, to an electrical power source 18 integrated with the PCB 2. The electrical power source 18 provides electrical power (or facilitates the provision of electrical power from another source), via the electrical interface 14 associated with a connector 10, to a pluggable light source 20 so as to provide electrical power for operation of the light source 20 (e.g., to facilitate activation and operation of a laser or other light generator integrated with the light source 20). An optical bus 16 connects, via optical waveguides 17 (e.g., optical fiber cables), with each optical interface 12 and a corresponding optical connector at each silicon photonics chip 6 to facilitate transmission of light from the light source to each chip 6.

As shown in FIG. 1, the PCB 2 can be designed to accommodate one or a plurality of pluggable light sources at a given time. For example, a pluggable light source 20 may be in operation (i.e., inputting optical signals to a silicon photonics chip 6) while another pluggable light source 20 is being connected for use with the PCB 2 (i.e., configured for connection with another silicon photonics chip 6). Further, a single pluggable light source can be utilized to provide an input optical signal to multiple silicon photonics chips 6 of the PCB 2. For example, the optical bus 16 of the PCB 2 can be configured to receive an optical signal from a pluggable light source 20 and split the signal for input to two or more chips 6. Thus, the PCB 2 can be integrated within a device so as to facilitate simultaneously (or near simultaneously) receiving an optical signal from a single pluggable light source 20 or receiving multiple optical signals from a plurality of pluggable light sources 20 for transmission to different photonics chips 6 for modulation and/or other processing of the optical signals based upon the device requirements and as controlled by the integrated circuit 4.

Figure 2:
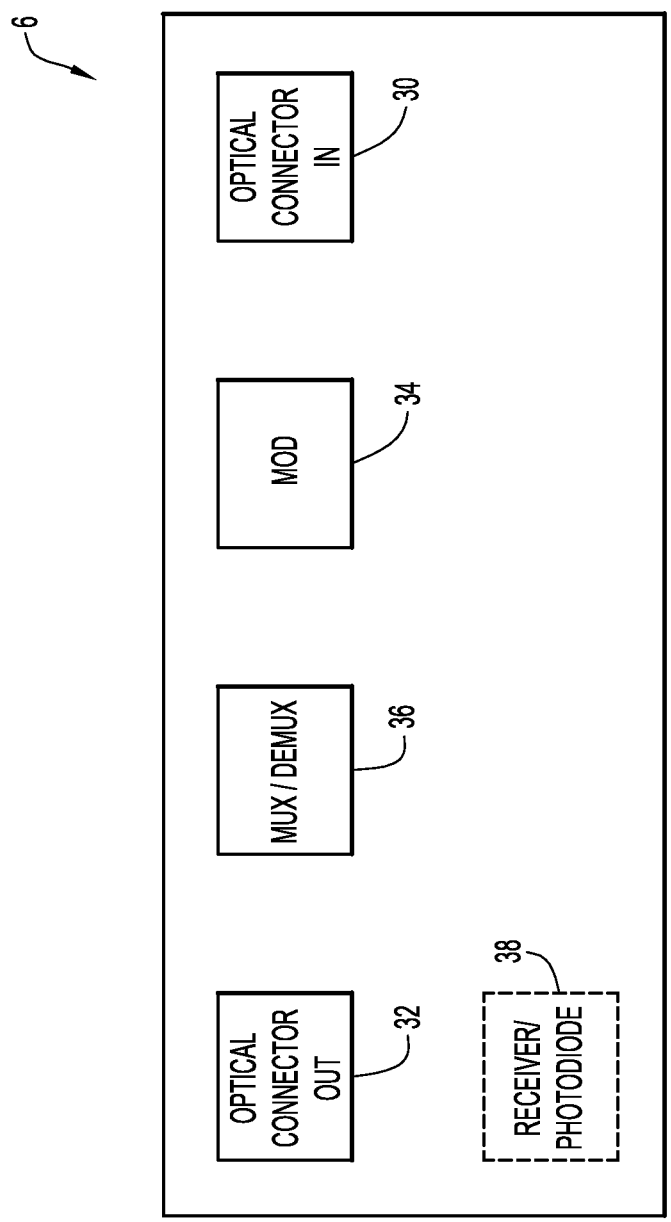
FIG. 2 depicts an example embodiment of a silicon photonics PHY chip structure for integration with the printed circuit board of FIG. 1.

Referring to FIG. 2, each chip 6 includes an optical connector 30 to receive input optical signals from a pluggable light source 20 (via the optical bus 16 and waveguides 17) and an optical connector to output one or more modulated signals from the chip 6. In addition, each chip 6 includes a modulator 34 configured to receive an input optical signal that has been transmitted by the pluggable light source as a constant optical signal and to output at least one modulated signal (e.g., one or more pulsed optical signals that are pulsed at one or more predetermined frequencies). A multiplexer/demultiplexer (MUX/DEMUX) 36 can also be provided for each chip 6 to control the number of modulated optical signals (e.g., at one or more pulsed frequencies) that are output at the optical connector 32 of the chip. Further, each chip 6 can optionally include a receiver/photodiode 38 integrated within the chip to convert modulated optical signals to corresponding electrical signals. Thus, the silicon photonics PHY chips 6 of the PCU 2 can be configured to output modulated optical signals as well as electrical signals corresponding with the optical signals.

Figure 3:
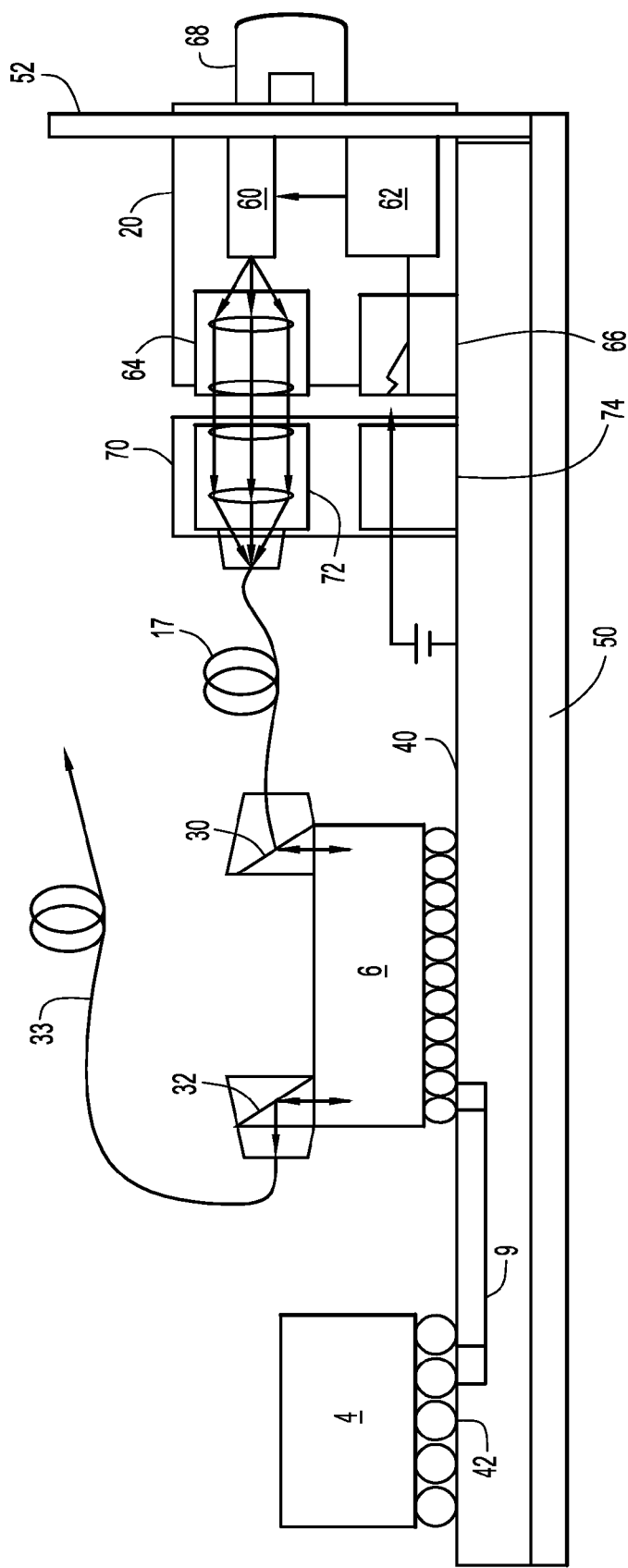
FIG. 3 is a block diagram depicting an example embodiment of an architecture for connecting a pluggable light source with a line card of photonics device.

An example architecture of a line card for a photonics device utilizing a pluggable light source is now described with reference to FIG. 3, where like reference numbers for FIG. 3 represent the same or similar components as for FIGS. 1 and 2. In particular, the example embodiment shows how a pluggable light source is easily connected at a single mechanical input end or interface with an input connection port of the device housing such that the pluggable light source is both optically and electrically coupled with components of the line card to facilitate operation of the pluggable light source as well as input of an optical signal (e.g., a constant optical signal) from the light source to components of the line card. A line card 40 having the general schematic configuration of the PCB 2 is secured within a device housing between a base housing wall 50 and side or end walls, including side or end wall 52. The line card 40 includes one or more silicon photonics PHY chips 6 that connect with an ASIC chip 4 via electrical connections 9 integrated within the line card (e.g., as conductive traces, vias and/or any other suitable types of conductive wiring patterns formed within the line card). While the line card 40 is depicted as a single printed circuit board (PCB), it is noted that the line card can also be configured as a plurality of PCBs that include one or more of the components depicted in FIG. 3 as well as any other suitable components for the device. The ASIC chip 4 and silicon photonics PHY chips 6 can be connected with the line card via a ball grid array (BGA) 42 as shown in FIG. 3 or, alternatively, via a flip chip in grid array or any other suitable electrical connections. Each chip 6 also includes an input optical connector 30 to receive an input optical signal from a pluggable light source 20 and also an output optical connector 32 to output one or more modulated optical signals to one or more waveguides 33 for transmission to another component of the line card 40 or to another device.

A pluggable light source 20 includes a laser 60 or, alternatively, any other suitable light generator component that generates an optical signal (e.g., a constant, unmodulated beam of light) at a sufficiently high optical power and a sufficiently low linewidth to provide an optical input for use by the device. A control circuit 62 provides electrical power to and controls operation of the laser 60. The control circuit 62 receives electrical power from the line card 40 via an electrical connector 66 that connects with a connection member 70 of the line card 40.

The connection member 70 is provided at a suitable location within the device housing and proximate housing side wall 52. The housing side wall 52 includes a suitable opening or window that serves as a port for insertion of a connecting end portion of the pluggable light source 20 within the device housing to facilitate installation of the pluggable light source 20 with the line card 40 during operation of the device. The pluggable light source 20 includes an optical connector 64 and an electrical connector 66 disposed at a connecting end of the light source 20 (with both optical and electrical connectors including portions that are disposed at single surface of the connecting end of the light source) to define a single end interface for the light source that provides a plug-in or plugging type connection for simultaneous or substantial simultaneous connection of the these connectors of the light source with corresponding connectors of the connection member 70 of the line card 40.

In particular, the optical connector 64 of the light source 20 is configured to engage and connect with a corresponding optical connector 72 of the connection member 70, while the electrical connector 66 of the light source 20 is configured to engage and connect with the corresponding electrical connector 74 of the connection member 70. The optical connector 72 of the connection member 70 connects, via one or more waveguides 17 (which may also include an optical bus 16, as depicted in FIG. 1), to the input optical connector 30 of the silicon photonics chip 6. The electrical connector 74 of the connection member 70 connects with a suitable power source provided or facilitated by the line card 40. Accordingly, connection of the optical and electrical connectors 64, 66 with the corresponding optical and electrical connectors 72, 74 of the connection member 70 during installation of the pluggable light source 20 into the port located at the side wall 52 of the device housing facilitates an optical connection between the laser 60 and the input optical connector 30 of a silicon photonics chip 6 as well as an electrical connection between the line card 40 and the control circuit 62 to render operable the laser 60.

The mechanical connection between the optical connector 64 and optical connector 72 can be of any suitable configuration that facilitates transfer of optical signals from the laser 60 through such connection with little or no loss or degradation of the optical signals. For example, the mechanical connection can be a male/female mechanical engagement between waveguide components of each optical connector, where alignment of the optical connectors 64, 72 results in a frictional and sliding fit of a waveguide component of one optical connector within a portion of a waveguide component of the other optical connector. The electrical connectors 66, 74 can also be configured to have a similar male/female frictional and sliding fit mechanical engagement that ensures an appropriate electrical connection is achieved at these connectors. A frictional and sliding connection in this manner between the optical connectors 64, 72 and the electrical connectors 66, 74 facilitates an easy plug-in type of engagement/connection and disengagement/removal of the pluggable light source 20 with respect to the line card 40 via the single side or end connection interface. Thus, the single interface connection arrangement that facilitates exchange of both optical and electrical signals provides for a relatively easy way in which to install the light source 20 with the line card 40 (e.g., in an analogous manner as connecting a flash drive or other component to a USB port of a computing device). This connection also facilitates an easy removal of the pluggable light source 20 from the line card 40 (e.g., when on light source 20 is to be replaced by or exchanged with another).

Optionally, the pluggable light source 20 can also include a handle 68 or other suitable type of gripping member connected with an outer housing portion of the light source that provides a way for a user to hold the light source in proper alignment so as to insert the connecting end of the light source into the port of the device housing to achieve the optical and electrical connections between light source and device. The handle 68 is provided on an end of the light source 20 that opposes the connecting end which includes the optical and electrical connectors 64, 66. The pluggable light source can optionally include any one or more suitable types of latching devices or latching structure that releasably connect with corresponding latching structure disposed on an exterior surface of the housing side wall 52 in order to ensure securing of the light source 20 to the device and to prevent inadvertent removal or disconnection between the corresponding optical and electrical connectors during operation of the light source with the device.

The pluggable light sources are suitable for use with any types of communication devices, in particular communication devices, such as servers, switching equipment, routing equipment, etc. that are configured to modulate optical signals for fiber optics and other data communications. The devices can be configured to receive input optical signals from one or more pluggable light sources and modulate the optical signals for output to other devices via suitable optical cable lines. Alternatively, or in addition to outputting modulated optical signals, the devices can also output electrical signals that correspond with the modulated optical signals.

Operation is now described of a device that includes a line card 40 and that facilitates installation of one or more pluggable light sources 20 as depicted in FIG. 3. A pluggable light source 20 is installed with the device by insertion of the connecting end of the light source, which includes optical and electrical connectors 64, 66, into the port at the housing side wall 52 of the device so as to connect the optical connector 64 of the light source 20 with a corresponding optical connector 72 of the line card connection member 70 while simultaneously (or near simultaneously) connecting the electrical connector 66 of the light source 20 with a corresponding electrical connector 74 of the line card connection member 70. The port of the housing side wall 52 can be configured to ensure that the light source 20 is properly aligned such that optical and electrical connectors of the light source and the line card are properly aligned for engagement and making a suitable mechanical connection. For example, the side wall port can be configured to have a suitable key configuration that matches a corresponding key configuration at the connecting end of the light source 20. Alternatively, appropriate indicia can be provided on the housing side wall 52 and at or near the connecting end of the light source 20 to ensure proper alignment and connection between the corresponding optical and electrical connectors. The handle 68 of the light source 20 can further be held by the user installing the light source to ensure proper alignment and engagement of the light source for connecting with the line card. In an embodiment in which latching structure is provided for the light source 20 and the side wall 52 of the device, the user connects such latching structure after securing a connection of the light source within the port of the device housing.

Upon suitable connection between the light source 20 and line card 40, the control circuit 62 of the light source 20 receives electrical power from the line card 40 to operate the laser 60. The laser 60 generates a constant and steady optical signal (e.g., a constant light beam) at a suitable intensity, which is directed toward the optical connector 64 for transmission (via waveguide(s) 17 and, optionally, an optical bus 16) to the input optical connector 30 of a silicon photonics chip 6 of the line card 40. The chip 6 receives control signals from the ASIC chip 4 (via electrical signal lines 9 of the line card) and accordingly modulates the optical signal based upon such control signals. In particular, the processor 5 of ASIC chip 4 executes control process logic instructions stored within memory 7, where the control process logic instructions include operational instructions for controlling one or more silicon photonics chips 6 and how optical signals are to be modulated on each chip 6.

The MUX/DEMUX unit 36 of the silicon photonics chip 6 can facilitate transmission of one or a plurality of modulated optical signals from the chip. The output optical connector 32 of the chip 6 transmits the modulated optical signal(s), via waveguide(s) 33, to one or more different devices and/or to one or more other components of the line card (or another portion of the device). As previously noted, a silicon photonics chip 6 can include a receiver/photodiode 38 to convert a modulated optical signal into a corresponding modulated electrical signal as output from the chip 6 in addition to the output modulated optical signal(s). The modulated electrical signals output from the chip 6 can be used by the line card 40 and/or transmitted to another device.

When the user desires to remove the pluggable light source 20 from the device (e.g., the device is not in use and/or the light source 20 needs to be replaced due to a failing laser 60 or exchanged with a different light source 20), the removal of the light source 20 is easily achieved by simply pulling the light source from the device housing port and side wall 52 in order to disengage the corresponding optical connectors and electrical connectors. Another pluggable light source 20 can then be installed in the same or similar manner.

Thus, the pluggable light source partitions the light generation component (which can have low reliability) from the silicon photonics PHY chip structure of the PCB (which typically has much higher reliability), which allows for easy exchange from one light source to another. This also enhances the field operability of certain devices, in which a light source can be easily removed from a device and replaced with another light source without requiring a complete replacement of the entire circuit board (which would require a greater down time or period of non-use for the device until such circuit board can be replaced). The mechanical interface, which can be provided on a single side or end surface of the pluggable light source (with optical and electrical connections being achieved between the light source and the device simultaneously or nearly/substantially simultaneously), provides an easy and effective mechanism for installation and removal of the light source from the device in a minimally intrusive manner.

While the example embodiments described herein and depicted in the figures provide a single PCB to which different components (e.g., the silicon photonics PHY chip, ASIC chip, etc.) are connected, it is noted that any suitable number of printed circuit boards, substrates or other supporting structures can be provided to support the different components of a device. In one example embodiment, one or more silicon photonics PHY chips and one or more ASIC chips may be connected with one or more PCBs, while the optical/electrical connectors to which one or more pluggable light sources connect may be disposed on one or more other PCBs (with waveguides, such as optical fibers, extending between PCBs to provide electrical power to the pluggable light source(s) and an optical pathway for light transmitted from the pluggable light source(s) to the silicon photonics PHY chip(s)).

The device incorporating at least one PCB as described herein and depicted in the drawings can further facilitate that installation and use (e.g., near simultaneous use) of multiple pluggable light sources, where each light source provides an optical signal to one or more corresponding silicon photonics chips which process the optical signal accordingly based upon instructions provided by the ASIC or other circuit components of the device. A pluggable light source can be removed and replaced easily and with little difficulty, so as to minimize any down time for the device during the replacement.

The above description is intended by way of example only.

What is claimed is:

1. A pluggable light source device for connection with an optical modulating device that includes an optical modulator component, the pluggable light source comprising:
   a light generator configured to generate an optical signal to be output from the light source device; and
   a connection member disposed at a connecting end of the light source device, the connection member comprising an optical connector that is coupled with the light generator, wherein the optical connector of the light source device is configured to engage with a corresponding optical connector of the optical modulating device when the connecting end of the light source device is connected via a plug-in engagement with a connection member of the optical modulating device so as to facilitate input of optical signals from the light generator to the optical modulator component;
   wherein the connection member disposed at the connecting end of the light source device further comprises an electrical connector, the electrical connector of the light source device is configured to engage with a corresponding electrical connector of the optical modulating device when the connecting end of the light source device is connected via the plug-in engagement with the connection member of the optical modulating device so as to facilitate input of electrical power provided by the optical modulating device to the light generator.

2. The pluggable light source device of claim 1, wherein the connecting end is configured to be inserted within a port of a housing wall of the optical modulating device that houses the optical connector and electrical connector.

3. The pluggable light source device of claim 1, wherein the connection member of the light source device is configured such that the plug-in engaging connection of the connecting end of the light source device with the connection member of the optical modulating device achieves a substantially simultaneous connection of the optical and electrical connectors of the pluggable light source device with the corresponding optical and electrical connectors of the optical modulating device.

4. The pluggable light source device of claim 1, further comprising a handle connected with an outer housing of the light source to assist in connection and removal of the light source with respect to the optical modulating device.

5. An apparatus comprising:
   a first device comprising:
      at least one printed circuit board;
      an optical modulator component coupled with a printed circuit board of the first device, wherein the optical modulator component is configured to receive an input optical signal and to output a modulated optical signal; and
      a connection member coupled with a printed circuit board of the first device and including an optical connector that is coupled with an input to the optical modulator component; and
   a second device comprising:
      a light generator configured to generate an optical signal to be output from the light source device; and
      a connection member disposed at a connecting end of the second device, the connection member comprising an optical connector that is coupled with the light generator, wherein the optical connector of the second device is configured to engage with the optical connector of the connection member when the connection member of the second device is connected via a plug-in engagement with the connection member of the first device so as to facilitate input of optical signals from the light generator to the optical modulator component.

6. The apparatus of claim 5, wherein the first device is configured to connect with another apparatus to facilitate transmission of modulated signals output by the optical modulator component to the second device.

7. The apparatus of claim 5, wherein the first device further comprises a plurality of optical modulator components to receive input optical signals and output modulated optical signals.

8. The apparatus of claim 7, wherein the first device further comprises a plurality of connection members, each connection member being connected with the printed circuit board and including an optical connector that is coupled with an input to at least one corresponding optical modulator component so as to facilitate a connection of a plurality of second devices with corresponding connection members of the first device and substantially simultaneous input of a plurality of optical signals from the second devices to corresponding optical modulator components of the first device.

9. The apparatus of claim 5, wherein the first device further comprises:
a first integrated circuit chip connected with the printed circuit board of the first device, wherein the optical modulator component is integrated in the first integrated circuit chip; and
a second integrated circuit chip connected with the printed circuit board of the first device, the second integrated circuit chip including a processor and a memory including control process logic instructions for the processor, wherein the processor is configured to control operations of the first integrated circuit chip, based upon execution of the control process logic instructions, to control modulation of optical signals output by the optical modulator component.

10. The apparatus of claim 5, wherein the connection member of the first device further comprises an electrical connector that is configured to receive electrical power from an electrical power source, and the connection member of the second device further comprises an electrical connector that is configured to engage with the electrical connector of the first device when the connection member of the second device is connected via the plug-in engagement with the connection member of the first device so as to facilitate input of electrical power provided by the first device to the second device for operation of the light generator of the second device.

11. The apparatus of claim 5, wherein the connection member of the second device and the connection member of the first device are configured to make a plug-in engaging connection that achieves a substantially simultaneous connection of the optical and electrical connectors of the second device with corresponding optical and electrical connectors of the first device.

12. The apparatus of claim 5, wherein the first device includes a housing that encloses each printed circuit board, the optical modulator component and the connection member of the first device, the housing including a housing wall with a port defined within the housing wall, and the connecting end of the second device is configured to be inserted within the port.

13. The apparatus of claim 5, wherein the second device further comprises a handle connected with an outer housing of the second device to assist in connection and removal of the second device in relation to the first device.

14. A method comprising:
connecting a first device to a second device via a plug-in engaging connection between connection members of the first and second devices, wherein the first device comprises at least one printed circuit board, an optical modulator component coupled with a printed circuit board of the first device and a connection member coupled with a printed circuit board of the first device, and the second device comprises a light generator and a connection member, the connection member of the second device being disposed at a connecting end of the second device and comprising an optical connector that is coupled with the light generator;
connecting the optical connector of the connection member of the second device with a corresponding optical connector of the connection member of the first device to make a plug-in engaging connection;
generating an optical signal via the light generator of the first second device;
inputting the optical signal from the light generator of the second device, via the connection between the optical connectors of the first and second devices, to the optical modulator component of the first device; and
modulating the optical signal via the optical modulator component of the second device.

15. The method of claim 14, further comprising:
outputting the modulated optical signal from the second device to another device.

16. The method of claim 14, wherein the connection member of the first device further comprises an electrical connector that is coupled with an electrical power source, and the connection member of the second device further comprises an electrical connector that connects with the electrical connector of the first device during the plug-in engaging connection between the connection members of the first and second devices, and the method further comprises:
providing electrical power from the power source to the light generator of the second device via the connection between the electrical connectors of the first and second devices.

17. The method of claim 16, wherein the plug-in engaging connection between the connection member of the second device and the connection member of the first device achieves a substantially simultaneous connection of the optical and electrical connectors of the second device with corresponding optical and electrical connectors of the first device to facilitate input of an optical signal from the second device to the first device and provision of electrical power from the first device to the second device for operation of the light generator of the second device.

18. The method of claim 14, wherein the first device further comprises a first integrated circuit chip connected with a printed circuit board of the first device, the optical modulator component being integrated with the first integrated circuit chip, and a second integrated circuit chip connected with a printed circuit board of the first device, the second integrated circuit chip including a processor and a memory including control process logic instructions for the processor, the method further comprising:
controlling, via the processor, operations of the first integrated circuit chip so as to control modulation of optical signals output by the optical modulator component.

19. The method of claim 14, wherein the first device includes a housing that encloses each printed circuit board, the optical modulator component and the connection member of the first device, the housing including a housing wall with a port defined within the housing wall, and the connecting of the first device with the second device further comprises inserting a portion of the connecting end of the second device within the housing wall port of the first device.

\* \* \* \* \*